No. 872,273.

PATENTED NOV. 26, 1907.

A. D. BRASSON.
GAS PRESSURE REGULATOR.
APPLICATION FILED JULY 9, 1907.

3 SHEETS—SHEET 2.

Witnesses

Inventor
Adelard D. Brasson,
By Victor J. Evans
Attorney

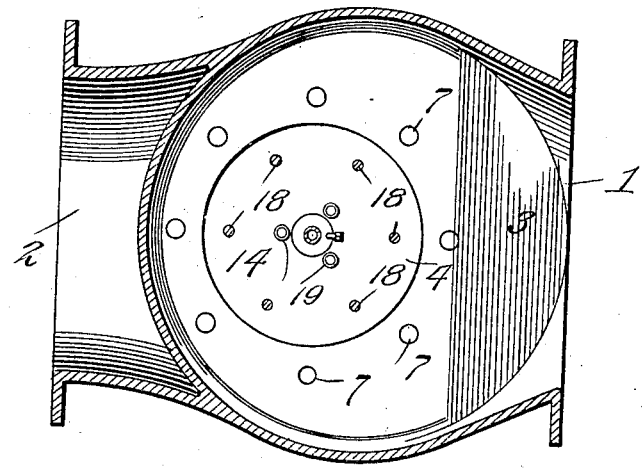
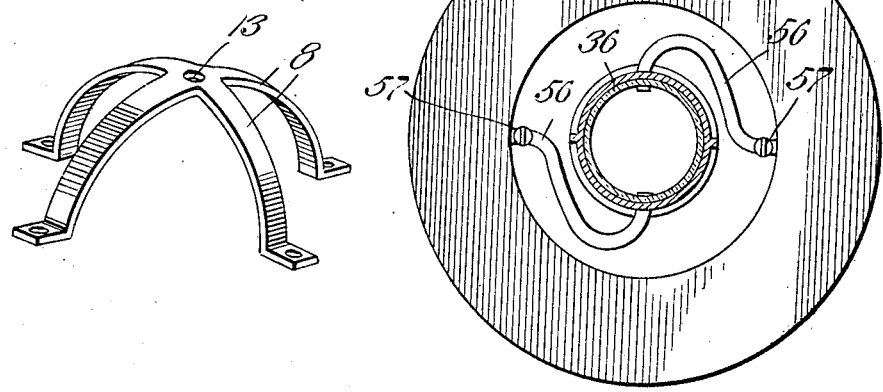

UNITED STATES PATENT OFFICE.

ADELARD D. BRASSON, OF SAN FRANCISCO, CALIFORNIA.

GAS-PRESSURE REGULATOR.

No. 872,273.

Specification of Letters Patent.

Patented Nov. 26, 1907.

Application filed July 9, 1907. Serial No. 382,952.

*To all whom it may concern:*

Be it known that I, ADELARD D. BRASSON, a citizen of the United States of America, residing at San Francisco, in the county of San Francisco and State of California, have invented new and useful Improvements in Gas-Pressure Regulators, of which the following is a specification.

This invention relates to gas pressure regulators, and one of the principal objects of the same is to provide a machine of simple construction which will operate automatically to insure a uniform pressure of gas in the supply main whether a large or small quantity of gas is being used.

Another object of the invention is to provide a gas pressure regulator which will not require the constant attention of a person to keep the apparatus in working order.

Figure 1:
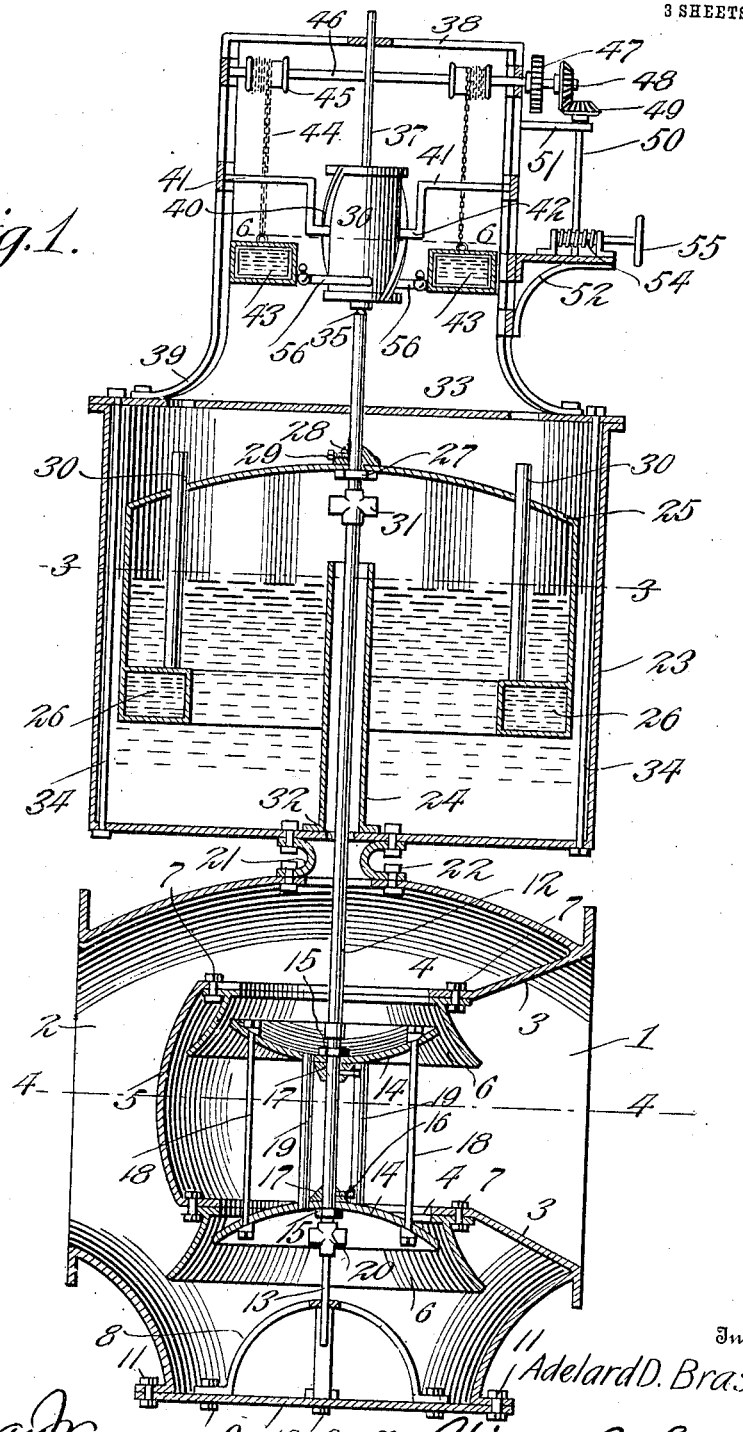
Figure 2:
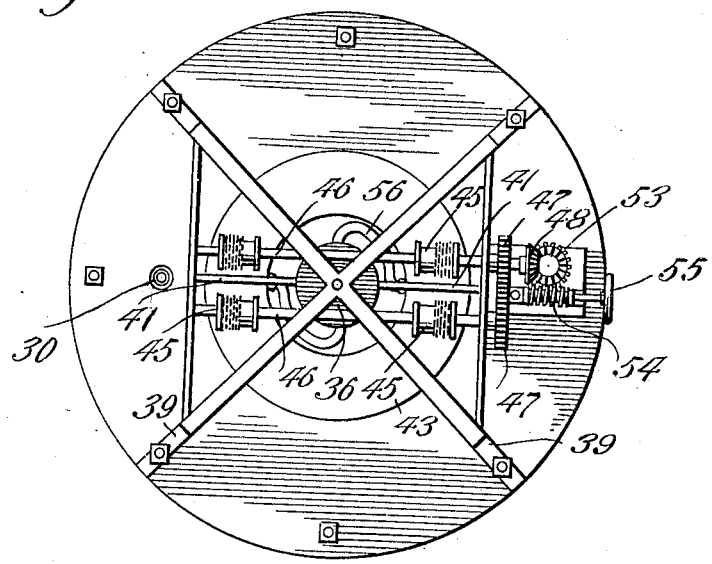
Figure 3:
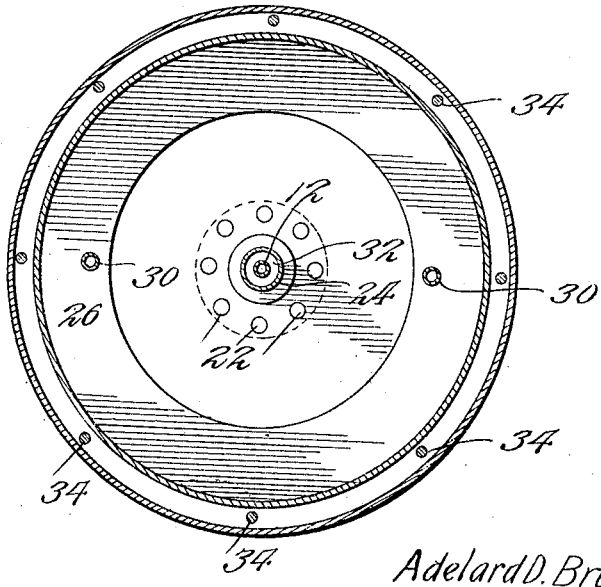

These and other objects may be attained by means of the construction illustrated in the accompanying drawings, in which:

Figure 1 is a central vertical section of a gas pressure regulator made in accordance with my invention. Fig. 2 is a top plan view of the same. Fig. 3 is a horizontal section on the line 3—3, Fig. 1. Fig. 4 is a horizontal sectional view on the line 4—4 of Fig. 1. Fig. 5 is a detail perspective view of a shaft supporting spider. Fig. 6 is a horizontal section on the line 6—6, of Fig. 1.

Referring to the drawings for a more particular description of my invention, the numeral 1 designates the inlet and 2 the outlet end of the main supply pipe. The inlet 1 is provided with flaring walls 3 which are provided with backwardly extending portions having suitable openings 4 therein at the top and bottom thereof, and a curved rear wall 5. Secured in line with the openings 4 are detachable valve seats, each provided with a flaring mouth 6 and a peripheral flange through which the bolts 7 pass, said bolts also passing through the metal at a point near the opening 4. A spider 8 is connected by bolts 9 to the bottom 10, said bottom being connected by bolts 11 to the body of the inlet connection. A vertical shaft 12 having a reduced lower end 13 mounted in the spider 8 and passing through the opening 13 therein carries a pair of valves 14, said valves being connected to the shaft 12 by means of nuts 15 and a suitable set screw 16 passing through a collar 17 slidable upon the shaft 12. The valves 14 are concavo-convex in cross section, and are connected together by means of rods or bolts 18 and extending through the valve are the pipes 19. At the lower end of the shaft 12 is a T-coupling 20 below the lower valve 14, said shaft 12 being hollow and the T-coupling 20 communicating with the interior of said shaft. A gas tight collar 21 is secured to the top of the inlet section by means of bolts 22 and supported upon said collar 21 is a gasometer 23 provided with a stand pipe 24 through which the hollow shaft 12 extends, and a gasometer bell 25 provided with an annular counterbalance chamber 26 is connected to the hollow shaft 12 by means of a lock nut 27 and a sliding collar 28 provided with a set screw 29. Upright tubes 30 connected to the counterbalance chamber 26 may be utilized for filling the chamber 26 with mercury or other suitable counterbalancing material.

A T-coupling 31 is secured to the hollow shaft 12 above the stand pipe 24. The hollow shaft 12 extends through an opening 32 in the bottom of the gasometer, and the top or cover 33 of the gasometer is held in place by means of a series of bolts 34. The hollow shaft 12 passes through an opening in the top 33 of the gasometer and the end of said shaft 12 is pointed, as at 35, and mounted upon said point is a rotatable governor 36 having secured to its upper end a rod 37 which passes through an opening in a frame 38, the legs of which, 39, are bolted to the top 33 of the gasometer. The rotatable governor 36 is provided with two oppositely disposed spiral ribs 40, and connected to the frame 38 is a pair of guides 41 having inwardly extending lugs 42 which bear upon the spiral ribs 40, and when said governor 36 is moved in an upward or downward direction, the governor is rotated by means of the spiral ribs and the inwardly projecting lugs 42, as will be understood. An annular mercury chamber 43 is suspended by means of chains 44 passing around drums 45 upon shafts 46 journaled in the frame 38, said shafts each having a pinion 47 thereon, said pinions adapted to intermesh and one of the shafts 46 is provided with a bevel gear 48 which meshes with a similar bevel gear 49 on a vertically disposed shaft 50 journaled in a bracket 51 near its upper end and in a similar bracket 52 at its lower end. The shaft 50 carries a worm wheel 53 and a worm 54 meshes with the wheel 53 and is provided with a hand wheel 55 by means of which the mercury chamber 43 may be raised and lowered. A flexible hose or pipe 56 is connected to the mercury chamber 43 and at the opposite end said hose is connected to the governor 36, two such flexible pipes being used and communicating with the governor and the mercury chamber, said pipes each having a suitable valve 57 therein.

The operation of my invention may be briefly described as follows: Gas entering the inlet 1 will pass up through the opening 4 and down through the opening 4 when the valves 14 are open. The gas passing through the upper opening 4 will pass through the collar 21 through the stand pipe 24 into the gasometer bell 25, while the gas which passes through the lower opening 4 may pass through the T-coupling 20 into the hollow shaft 12 and discharge into the gasometer bell through the T-coupling 31. As the gasometer bell 25 rises the valves 14 will close or partially close to regulate the flow of gas through the openings 4. The governor 36 may be set by the hand wheel 55 so that the mercury in the chamber 43 will pass into the governor 36 through the hose pipe 56 or the mercury can be passed from the governor 36 into the chamber 43, the rotation of the governor 36 preventing the hose pipe 56 from forming a loop in which the mercury will lodge and prevent the proper operation of the same.

From the foregoing it will be obvious that a gas pressure regulator is of comparatively simple construction and will operate sufficiently to secure a uniform pressure of gas in the main.

Having thus described the invention, what I claim is:

1. A gas pressure regulator comprising an inlet section provided with flaring valve seats, oppositely disposed valves connected to a hollow shaft, a gasometer, a gasometer bell secured to said shaft, and a rotatable governor supported upon the upper end of said hollow shaft and provided with oppositely disposed spiral ribs, guides provided with lugs to bear against said ribs, and an annular mercury chamber provided with flexible pipes leading therefrom to the rotatable governor, and means for raising and lowering the mercury chamber.

2. In a gas pressure regulator, the combination of an inlet section, oppositely disposed valves therein, a gasometer, a gasometer bell connected to said shaft and a rotatable governor provided with flexible hose connections, and an adjustable mercury chamber.

3. A gas pressure regulator comprising an inlet section provided with flaring valve seats, concavo-convex valves connected together and supported upon a hollow shaft, a gasometer, said shaft passing through said gasometer and through a stand pipe secured to said gasometer, a gasometer bell connected to said hollow shaft and governing devices comprising a rotatable governor, a suspended mercury chamber and means to raise and lower the same, and flexible pipes extending from said governor to said mercury chamber.

4. In a gas pressure regulator, a governor comprising a hollow, rotatable chamber provided with oppositely disposed spiral ribs, guides provided with lugs which bear upon said ribs, and an adjustable mercury chamber having flexible hose connections which communicate with said governor.

In testimony whereof, I affix my signature in presence of two witnesses.

ADELARD D. BRASSON.

Witnesses:
EDWARD L. THOMAS,
A. C. WALLACE.